US00RE42439E

(19) United States
(12) Reissued Patent
Fulton

(10) Patent Number: US RE42,439 E
(45) Date of Reissued Patent: Jun. 7, 2011

(54) CANOPY MODIFICATION USING COMPUTER MODELLING

(75) Inventor: Dan Fulton, Winnipeg (CA)

(73) Assignee: ArborCom Technologies, Inc., Shelburne, Nova Scotia (CA)

(21) Appl. No.: 10/755,259

(22) Filed: Jan. 8, 2004

Related U.S. Patent Documents

Reissue of:
(64) Patent No.: 6,338,027
Issued: Jan. 8, 2002
Appl. No.: 09/320,676
Filed: May 27, 1999

(51) Int. Cl.
*G01J 1/20* (2006.01)

(52) U.S. Cl. ..... 702/127; 702/146; 702/150; 702/151; 702/155; 702/156

(58) Field of Classification Search ..... 702/4, 5, 702/127, 146, 150, 151, 155, 156; 235/88 G; 33/1 DD, 268, 228, 121; 342/450, 451, 26; 356/218, 222, 226, 432
See application file for complete search history.

(56) References Cited

U.S. PATENT DOCUMENTS 3,779,651 A * 12/1973 Gunlock ..... 356/213
4,015,116 A * 3/1977 Bahm ..... 250/206
4,159,576 A * 7/1979 Campbell ..... 33/281
4,186,297 A 1/1980 Owner-Petersen et al.
4,236,313 A 12/1980 Griffin
4,237,611 A * 12/1980 Wurch et al. ..... 33/1 DD
4,288,922 A * 9/1981 Lewis ..... 33/1 DD
4,364,183 A * 12/1982 Rhodes ..... 33/268
4,445,030 A * 4/1984 Carlton ..... 250/203 R
4,635,371 A 1/1987 Dalrymple
4,656,748 A * 4/1987 Thual ..... 33/268
4,672,191 A * 6/1987 Cofield ..... 250/203 R
4,678,330 A 7/1987 Gutschick et al.
4,945,644 A * 8/1990 Fuller ..... 33/270
5,062,212 A * 11/1991 Blaker ..... 33/270
5,197,199 A * 3/1993 Shrader ..... 33/270
5,379,215 A 1/1995 Kruhoeffer et al.
5,425,178 A * 6/1995 Steele ..... 33/271
5,732,473 A * 3/1998 Gagnon ..... 33/270
5,808,583 A * 9/1998 Roberts ..... 342/359
5,860,648 A * 1/1999 Petermeier et al. ..... 273/108.2
5,943,164 A * 8/1999 Rao ..... 359/462
6,236,360 B1 * 5/2001 Rudow et al. ..... 342/357.13

(Continued)

OTHER PUBLICATIONS

Bob Christensen, "Where's the Sun! Sunlight Location Technology can Make a Difference on Greens", Green Master Magzine, Jan. 1999.

(Continued)

*Primary Examiner* — Carol S Tsai
(74) *Attorney, Agent, or Firm* — Leffert Jay & Polglaze, P.A.

(57) ABSTRACT

A method and system for determining canopy coverage to a golf green to assist in increasing sunlight exposure of the green. The system allows users to enter data regarding the golf green, surrounding foliage, and other topographical and man-made features surrounding the green. The system can then plot the sun's path for a specific date and simulate shadows cast on the green by the surrounding foliage and features. Furthermore, the system allows the user to generate what-if data, allowing projected effects on canopy coverage to be viewed before any modifications to the canopy are carried out.

32 Claims, 9 Drawing Sheets

A1 - 8-9 HOURS OF SUNLIGHT
B1 - 9-10 HOURS OF SUNLIGHT
C1 - 10-11 HOURS OF SUNLIGHT
D1 - 11-12 HOURS OF SUNLIGHT
E1 - 12-13 HOURS OF SUNLIGHT

U.S. PATENT DOCUMENTS

| | | | | |
|---|---|---|---|---|
| 6,236,940 | B1 * | 5/2001 | Rudow et al. | 701/300 |
| 6,274,862 | B1 * | 8/2001 | Rieger | 250/216 |
| 6,470,242 | B1 * | 10/2002 | Rudow et al. | 701/1 |
| 6,525,690 | B2 * | 2/2003 | Rudow et al. | 342/357.13 |

OTHER PUBLICATIONS

Nancy Stairs, "Confict Resolution", Landscape Management, Aug. 1998.
TurfNet Associates, Inc., "Eliminating the Guesswork of SHADE", TurfNet Monthly, Jul. 1998.
Robert A. Christensen, "Shedding New Light on an Age-Old Problem", Tree Care Industry, vol. 9, No. 3, Mar. 1998.
Robert A. Christensen, "The Ace in the Hole: Bringing Sanity to the Greens", On Course, vol. 51, No. 9, Feb. 1998.
David A. Oatis, "Using Technology to Solve an Old Problem:Trees", USGA Green Section Record, vol. 35, No. 3, May/Jun. 1997.
Adrien Gallant, "Management by the Stars: Canadian Arborist Uses Astronomy to Shed More Light on Golf Course Green", Golf Course Management, Mar. 1997.

* cited by examiner

CANOPY MODIFICATION USING COMPUTER MODELLING

Matter enclosed in heavy brackets [ ] appears in the original patent but forms no part of this reissue specification; matter printed in italics indicates the additions made by reissue.

FIELD OF INVENTION

This invention relates to shade modification techniques and in particular the use of analytical methods to simulate and increase the amount of sunlight exposure of a golf green.

DESCRIPTION OF THE RELATED PRIOR ART

Proper maintenance of golf greens is essential to the running of a good golf course. A poorly maintained green can unfairly affect scoring while a well maintained green is consistent for all players. A well maintained green can also render putting more predictable and therefore less frustrating. A major component to maintaining a good golf green is having the grass grow evenly across the green and to have the grass grow without any diseases. Unfortunately, given the topography and tree cover that makes golf courses so aesthetically pleasing, sunlight is not evenly distributed throughout the green. A tree adjacent to a green, while pleasing to the eye, may block significant amounts of sunlight from reaching parts of the green throughout the day. This leads to uneven grass growth and makes grass more susceptible to diseases. Shaded parts of the green will have lesser growth and more susceptibility to diseases while unshaded parts would have healthier, better growing grass. Furthermore, players who enjoy being in the sun may find greens that are shaded bothersome for significant parts of the day.

However, even with the problems above, it is difficult to determine the amount of sunlight and, concomitantly, shade that a green receives. In order to do so the interaction between the sun and any trees or features blocking the sun must be studied and analyzed. Such an analysis can only be accomplished if the sun's path across the sky is charted in conjunction with the position of any trees or features that may block sunlight.

While tracking the sun's movement is an eons old occupation and while observing the shadows cast by various objects is also quite old, there are no analytical tools which are specifically tasked to assist an arborist or turf manager in accomplishing these tasks with respects to trees. There have been devices which can track the sun and some that even have been able to give an indication however slight, of the sun's path and its effect on a structure's silhouette.

A patent issued to Gutschick (U.S. Pat. No. 4,678,330) measures the solar radiation in a vegetative canopy by attaching sensors to the leaves of the vegetative canopy. A computer then samples the sensor readings and determines the amount of solar radiation that the canopy receives. While this invention is quite ingenious, it does not accomplish what is required by golf managers and arborists. Gutschick provides data and a data processing capability to determine solar radiation in specific spots but does not provide any means to determine shade data, sunlight exposure analysis, nor a what-if capability to determine which tree, structure, or even tree branch can be modified to provide better light exposure. While this apparatus can be used for this purpose, it would be a time consuming and tedious process to attach a multiplicity of sensors to leaves on each and every relevant tree adjacent the green. Also, Gutschick does not provide any means to determine which trees are the relevant ones in terms of a golf green's light exposure.

Another patent, issued to Dalrymple (U.S. Pat. No. 4,635,371) provides for a device which can be used to determine the path of the sun at any given time and day. The device is a hand-held cylindrical device through which the user can view an area of interest. By viewing the area of interest through the lens of the device and through the markings on the lens, the viewer can see the path the sun would travel at certain times of the year. The markings are graduated to show where the sun would be at certain times of the day and at certain times of the year. Unfortunately, this patent does not show the actual amount of sunlight the sun provides to an area. The device only shows the path the sun would travel. While one can theoretically determine the amount of sunlight an area may get, there is no means to determine the behavior of either the sunlight or of shadows cast because of the sun. To determine the amount of sunlight an area may receive, the user would have to perform a mental projection of how the sun would effect shadows in the area. Also, Dalrymple does not provides any means to model sunlight behavior nor any means to provide a what-if capability to determine the impact of any canopy modification.

A third patent, U.S. Pat. No. 4,288,922, issued to Lewis, is a device which has a wide angle viewer and a transparent screen which has marked on it the paths the sun travels at various times of the year. When the viewer peers through the viewer, the paths of the sun can be determined for different times of the year. Also, by having the area of interest in front of the device, the relevant features, such as a tree or a church, is superimposed on the transparent screen. Thus, by looking through the viewer, the user can then quickly determine how long, per day, the area of interest would be covered in shade at specific times of the year. While Lewis seems to be accomplishing what is required, it runs into problems when there are multiple trees or items that contribute to the shade. If, for example, a clump of trees were providing shade, there is no means to determine which tree contributed most to the combined shade. One may extrapolate by a rough estimate, using this invention, which tree contributes the most to the shade. However, this rough estimate is by no means conclusive of the desired results. The Lewis device, when used with a judicious eye and sound judgment, may provide an approximation of what would happen if a tree or a branch were removed. However, this again depends on the abilities of the user. Human judgment is by definition imprecise and therefore not suitable for determining proper canopy coverage.

A fourth patent, (U.S. Pat. No. 4,186,297) issued to Owner-Peterson et al. is for a sunlight calculator that is comprised of a base portion and two sliding plates. One of the sliding plates is transparent and has a double curve system that allows the plotting of any day/hour combination. A further curve gives an indication of the heating effect of the sun given the relevant data such as the time and sun position. The invention is in effect a large slide rule that allows the user to calculate specific information regarding the sunlight that enters a specific window on a facade. By sliding the plates properly, one can determine the path the sun would take on a specific day, how much heat the sun would generate through square units of window portions of the facade. Clearly, this device was envisioned as a calculator to be used to determine the effect of sunlight entering through a window. Owner-Peterson is directed towards, among other things, determining the amount of heat energy entering through a window. While this invention does track the sun's movement, it does not give an indication of shade or sunlight behavior.

Another patent in this area (U.S. Pat. No. 5,379,215) was issued to Kruhoeffer et al. and related to a weather visualization system. With this system, the user can generate a three dimensional picture, complete with sunlight, shadows, clouds, and other weather effects. Also, the user can generate a simulated "fly-by" of the scene. The invention uses a computer to generate the image and it takes into account all the relevant data such as the date and the time of day. The invention also extracts information from satellites and other sources of real-time information to continually update the image. While Kruhoeffer does provide an image of the general area with an indication of the sun's position and its effects on the landscape, it does not have the capability to project possibilities. Also, the invention provides a macroscopic view of the area whereas what is needed is a more localized view of the area. Furthermore, this invention makes use of a pre-made three dimensional terrain map, requiring large capital outlays to acquire such a map.

A final patent found in this area, U.S. Pat. No. 4,236,313 issued to Griffin, provides an apparatus that determines solar exposure at different locations. The device allows the user to determine the amount of solar exposure an area receives by tracking the sun's path at different times of the year. Griffin is comprised of a base, an elevated sun pointing device, and numerous means to adjust the sun pointing device depending on the date and the time of day. On a theoretical level, this invention allows the user to visually track the sun's path on a specific time of year and, by doing it in front of a tree of interest, determining where the sun would be relative to the tree. However, neither the device nor the method claimed allows the user to project shadows resulting from the sun's position. Also, neither of these two allow the user to automatically determine which obstruction out of many contributes the most to the shade covering an area.

As can be seen, none of the above devices are geared specifically to assist an arborist or turf manager in making canopy pruning or canopy removal decisions. Also, none of these devices can provide recommendations as to which parts of a tree to prune or which tree provides the most shade. Perhaps most importantly, none of these devices can provide an arborist with data as to what effects pruning or tree removal may have on a green's sunlight exposure even before any pruning or tree removal is done.

From the above, it is clear that a tool is needed that can assist an arborist or turf manager in making decisions. The tool must be easy to use, flexible in terms of flexibility and, ideally, provide the arborist with possible shade or sunlight effects of projected canopy modifications.

SUMMARY OF THE INVENTION

The present invention overcomes the deficiencies identified in the prior art. The present invention provides a computer system that can be used to model a sun's path across the sky, model shadows caused by trees and other sunblocking objects, and analyze the sunlight exposure of a golf green.

The above object is achieved by providing a computer system having data storage means and a memory for determining sunlight exposure of an area, said system including:

- input means for receiving and storing in memory area data entries which define a size and shape of the area and a first and at least one second predetermined location
- input means for receiving and storing in the memory temporal data entries defining a time and date range
- input means for receiving and storing in the memory obstruction data entries defining a size and relative position of at least one sunlight obstructing object
- processing means for performing sun calculations which determine multiple solar positions of the sun in the sky based on the temporal data entries and the area data entries
- processing means for performing shadow calculations for each solar position, said shadow calculations determining a size, shape and position relative to the area of a shadow cast by the or each sunlight obstructing object
- processing means for determining for each square unit of the area a sunlight exposure time based on the shadow calculations
- output means for generating shadow calculation results and portraying a representation of the shadow calculation results and
- output means for generating sun calculation results and portraying a representation of the sun calculation results Preferably, the area data entries include an earth based latitude of the area, a magnetic declination of the area, azimuth readings of multiple points on a perimeter of the area, and area distance readings of each of the multiple points on the perimeter, wherein said area distance readings are measured between each of the multiple points on the perimeter and the first predetermined location and said area azimuth readings are relative to magnetic north and are determined from said first predetermined location.

More preferably, the first predetermined location is within the area and the area data entries include a longitude of the area.

Most preferably, the area data entries include, for the or each second predetermined location, second location azimuth readings relative to magnetic north and second location distance readings, wherein second location azimuth readings are determined from the first predetermined location and the or each second location distance readings are measured between the or each second predetermined location and the first predetermined location within the area.

Conveniently, the obstruction data entries include obstruction azimuth readings of the or each sunlight obstructing object and obstruction distance readings for the or each sunlight obstructing object, an elevation reading for the or each sunlight obstructing object, wherein said obstruction distance readings are measured between a location of the or each of the sunlight obstructing object and a location chosen from the group comprising the first predetermined location and the at least one second predetermined location and said obstruction azimuth readings are relative to magnetic north and are determined from a location chosen from the group comprising the first predetermined location and the at least one second predetermined location.

More conveniently, the at least one sunlight obstructing object is a tree and wherein the obstruction data entries further include a tree crown shape for the or each tree, a crown upper elevation reading for the or each crown of the or each tree, a crown lower elevation reading for the or each crown of the or each tree, a left crown azimuth reading for the or each crown of the or each tree, and a right crown azimuth reading for the or each crown of the or each tree wherein said crown elevation readings are measured between a location of the or each of the sunlight obstructing object and a location chosen from the group comprising the first predetermined location and the at least one second predetermined location and said crown azimuth readings are relative to magnetic north and are determined from a location chosen from the group comprising the first predetermined location and the at least one second predetermined location.

Most conveniently, the obstruction data entries include at least one growth rate for the or each tree and an aging time span.

Also preferably, the computer system further includes processing means for increasing the crown azimuth readings and the crown elevation readings for the or each tree based on the or each growth rate and the aging time span.

More preferably, the at least one sunlight obstructing object is a block of trees and wherein the obstruction data entries further include tree block azimuth readings of multiple points on a block perimeter of the block of trees, tree block distance readings of each of the multiple points on the block perimeter, an average crown upper elevation reading for the block of trees, and an average crown lower elevation reading for the block of trees wherein said tree block azimuth readings are relative to magnetic north and are determined from a location chosen from the group comprising the first predetermined location and the second predetermined location and said tree block distance readings are measured between each of the multiple points on the block perimeter and a location chosen from the group comprising the first predetermined location and the at least one second predetermined location.

In another embodiment, the invention provides a method of modifying foliage on a golf course to provide more sunlight to a golf green, the method comprising:

determining characteristics of the green including size, shape, and location of the green determining characteristics of the foliage including size, shape, and location relative to the green performing a sun simulation of a path of the sun across the sky during a predetermined date and time range performing a shadow simulation of the shadows cast on the green by the foliage based on the sun simulation and the characteristics of the foliage performing a unit area calculation for each unit area of the green, said unit area calculation determining an amount of sunlight each unit receives based on the shadow simulation determining at least one course of action to provide more sunlight to the green based on the unit area calculation, the or each course of action being chosen from a group comprising:

pruning the foliage removing the foliage relocating the foliage performing a modified shadow simulation of the shadows cast on the green by the foliage if the or each course of action were followed, said modified shadow simulation being based on the sun simulation and projected characteristics of the foliage performing a modified unit area calculation for each unit area of the green, said modified unit area calculation determining a modified amount of sunlight each unit receives based on the modified shadow simulation In yet another embodiment, the invention provides a method of determining modifications to sunblocking objects on a golf green to provide more sunlight to the green, the method comprising:

a. Determining a size, shape, and geographical location of the green b. Determining a size, shape, and position relative to a predetermined point of at least one sunblocking object c. Determining a relevant path of the sun across the sky as observed from the geographical location of the green for a predetermined date and time range d. Performing a shade calculation resulting in shade results, said shade results determining an amount of shade cast on the green by the or each sunblocking object based on the relevant path of the sun and the size, shape, and position of the or each sunblocking object e. Performing a modified calculation resulting in modified shade results, said modified shade results determining a modified amount of shade cast on the green by the or each sunblocking object based on the relevant path of the sun and a modification of the or each sunblocking object, said modification being chosen from a modification group comprising:

altering the shape of the or each sunblocking object removing the or each sunblocking object altering the size of the or each sunblocking object a combination of altering the size and the shape of the or each sunblocking object f. Determining which modification from the modification group provides more sunlight to the golf green based on a comparison of the shade results and the modified shade results g. Generating a visual representation of the shade results and the modified shade results Preferably, step e) further includes generating a visual representation of the or each sunblocking object The advantages of the present invention are numerous. The computer system is flexible in its capabilities as it allows the arborist to generate visual representations of the calculation results. Also, the computer system provides what-if scenarios, allowing the arborist or turf managers to determine which canopy modification strategy works best. Furthermore, the system and the method gives the arborists or turf managers the capability to determine what sunlight cover would be like at any time of the year.

BRIEF DESCRIPTION OF THE DRAWINGS

A better understanding of the invention will be obtained by considering the detailed description below, with reference to the following drawings in which.

DETAILED DESCRIPTION OF THE INVENTION

Figure 1:
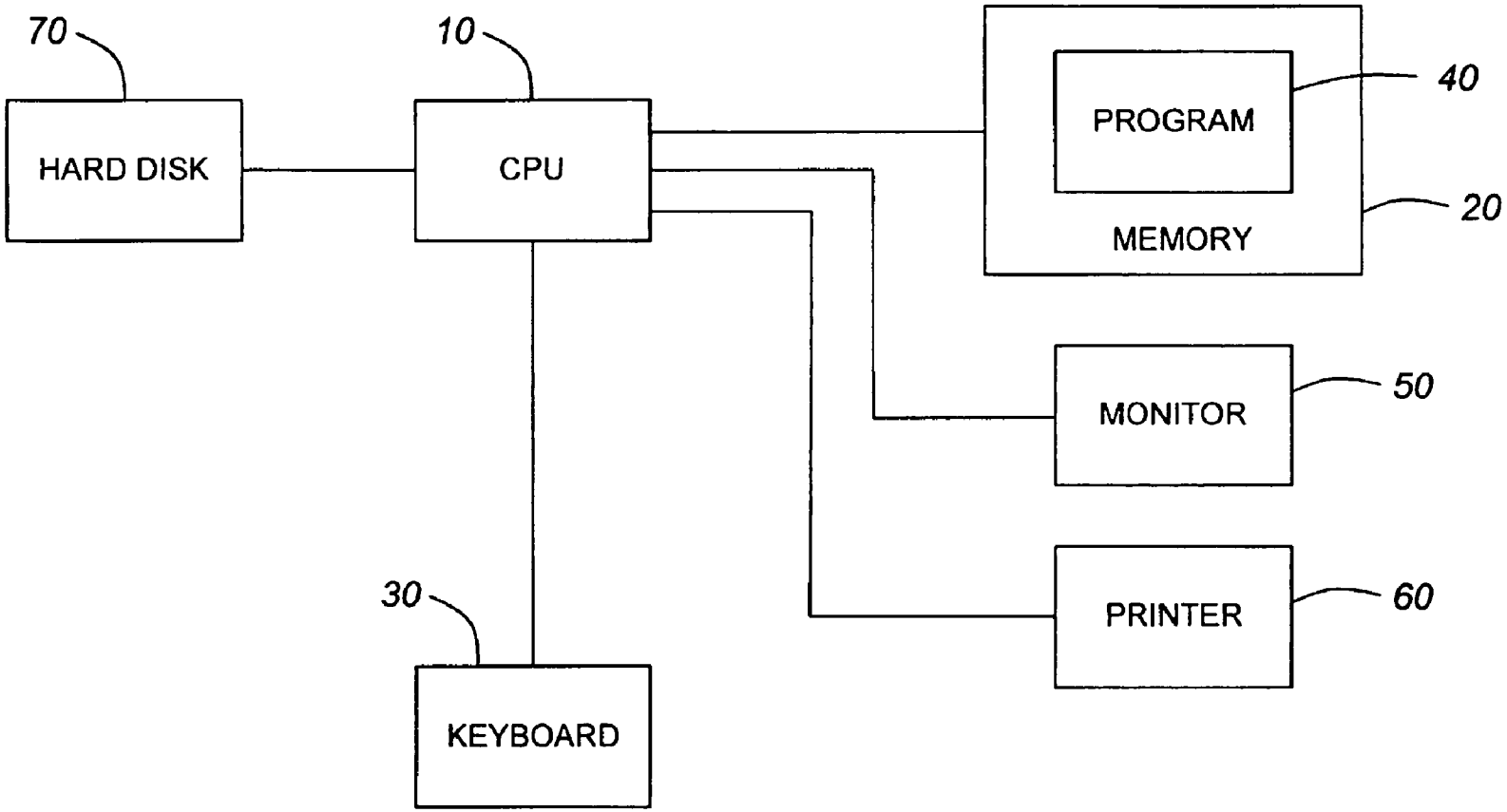
FIG. 1 is a block diagram of the components of the invention.

FIG. 1 illustrates the components of the computer system ideally used to practice the invention. The ideal components are a CPU 10, a memory 20, a keyboard 30, a program 40 residing in the memory 20, and a monitor 50. A printer 60 can also be attached to provide printouts of the relevant data. Furthermore, have data storage means such as a hard drive 70 is required. The CPU 10 would perform all the calculations required while the keyboard 30 is used to enter the required data.

Figure 2:
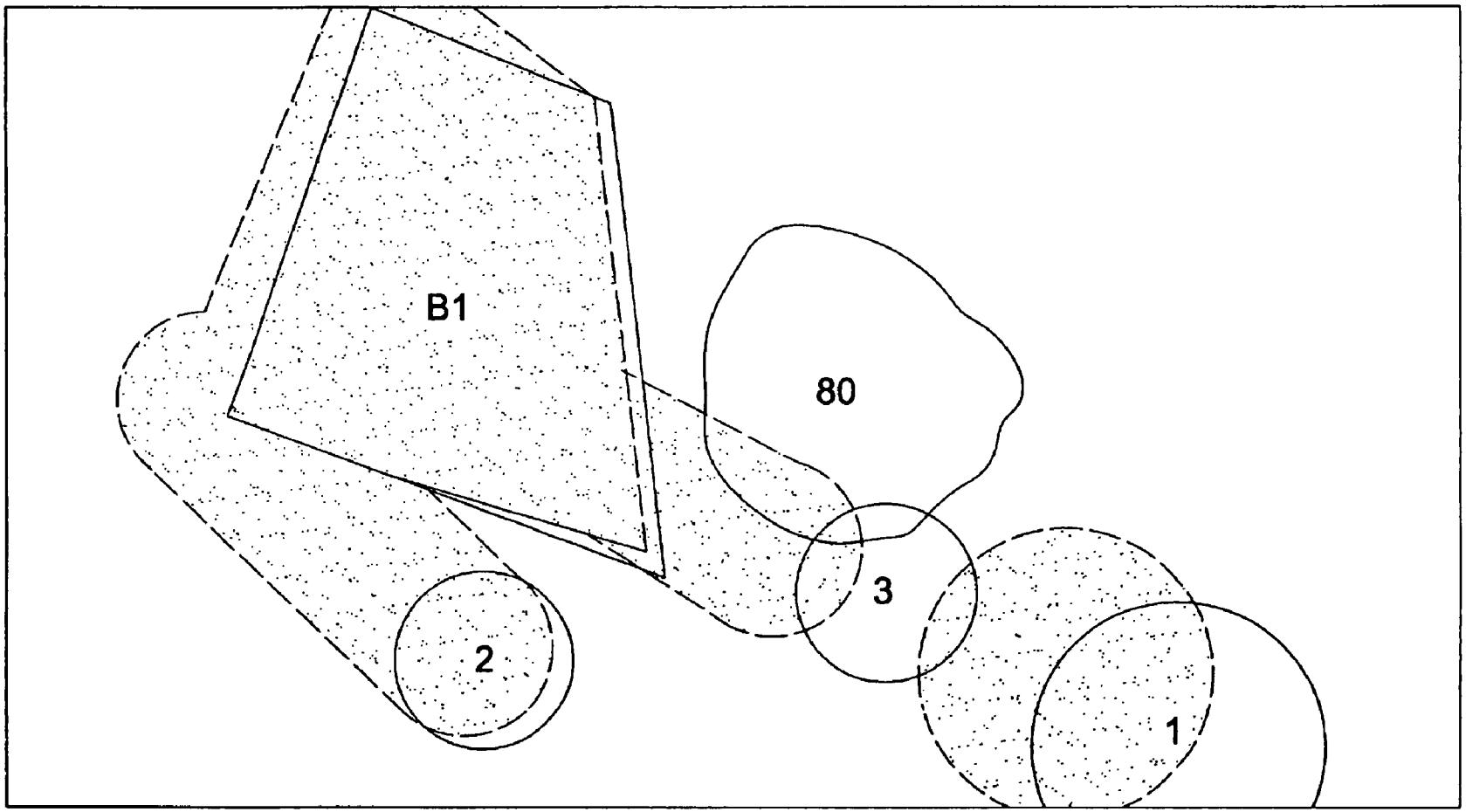
FIG. 2 is a schematic diagram of a golf green as generated by a computer program used to practice the invention.

FIG. 2 shows an overhead schematic view of a sample golf green generated by a program 40. As can be seen from FIG. 2, the golf green 80 is flanked by the trees 1,2, and 3. Also, the golf green 80 is flanked by a building B1.

Defining the golf green 80 to the program 40 is accomplished by taking azimuth readings of numerous points on the perimeter of the green 80.

Figure 3:
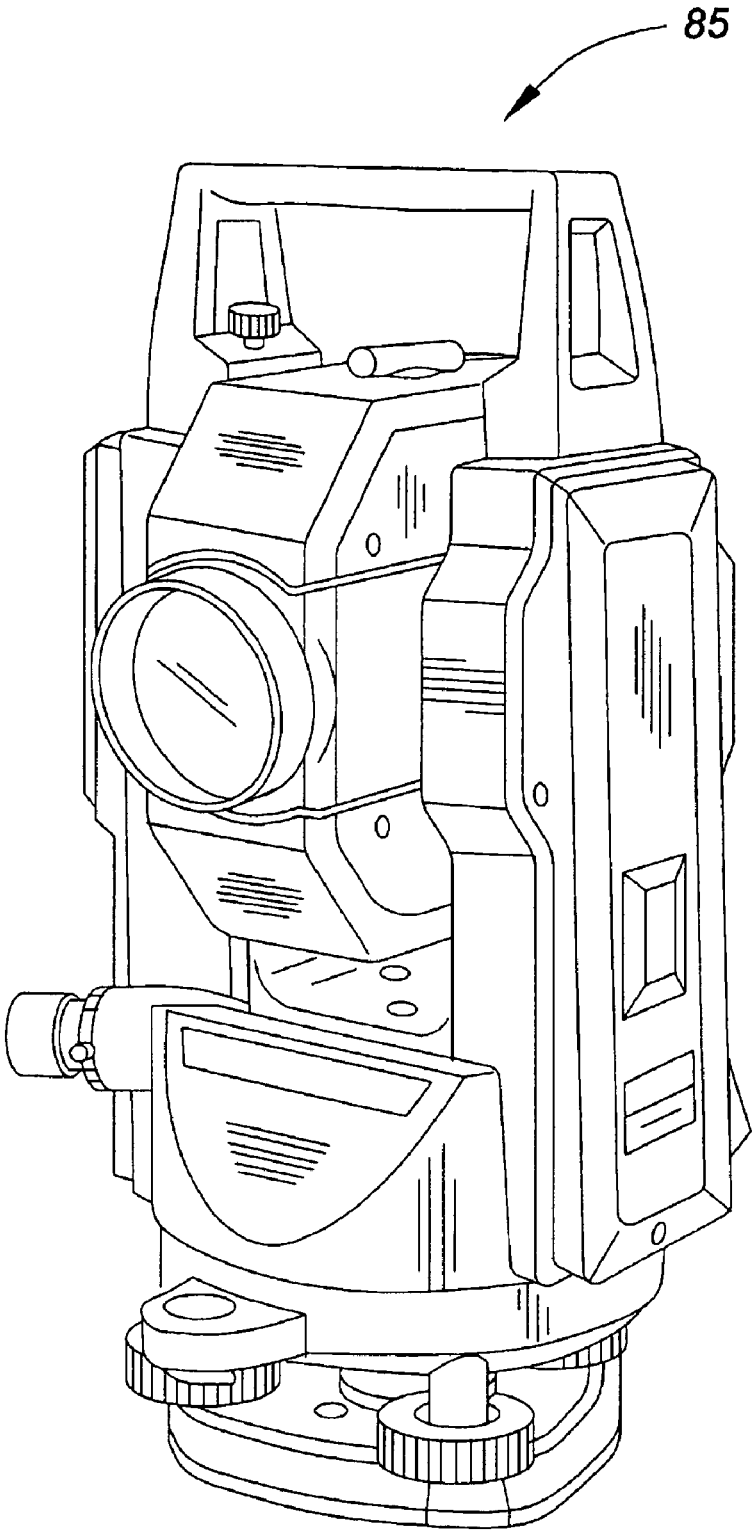
FIG. 3 shows a measuring instrument that can be used to assist in practising the invention.

Such measurements, and others that are required by the invention, can be taken by the use of well-known surveying instruments such as the Nikon C-100 Total Station. These measuring instruments, such as the instrument 85 shown in FIG. 3, can take elevation and azimuth readings of sight. Some of these instruments also measure distances. For our purposes, azimuth is the distance from magnetic north as expressed in degrees. For example, 90 degrees=east, 180 degrees=south, 270 degrees=west, and 360 degrees=north. Also for our purposes, elevation is the distance from level as expressed in degrees. For example, level=90 degrees and vertical is 0 degrees.

Figure 4:
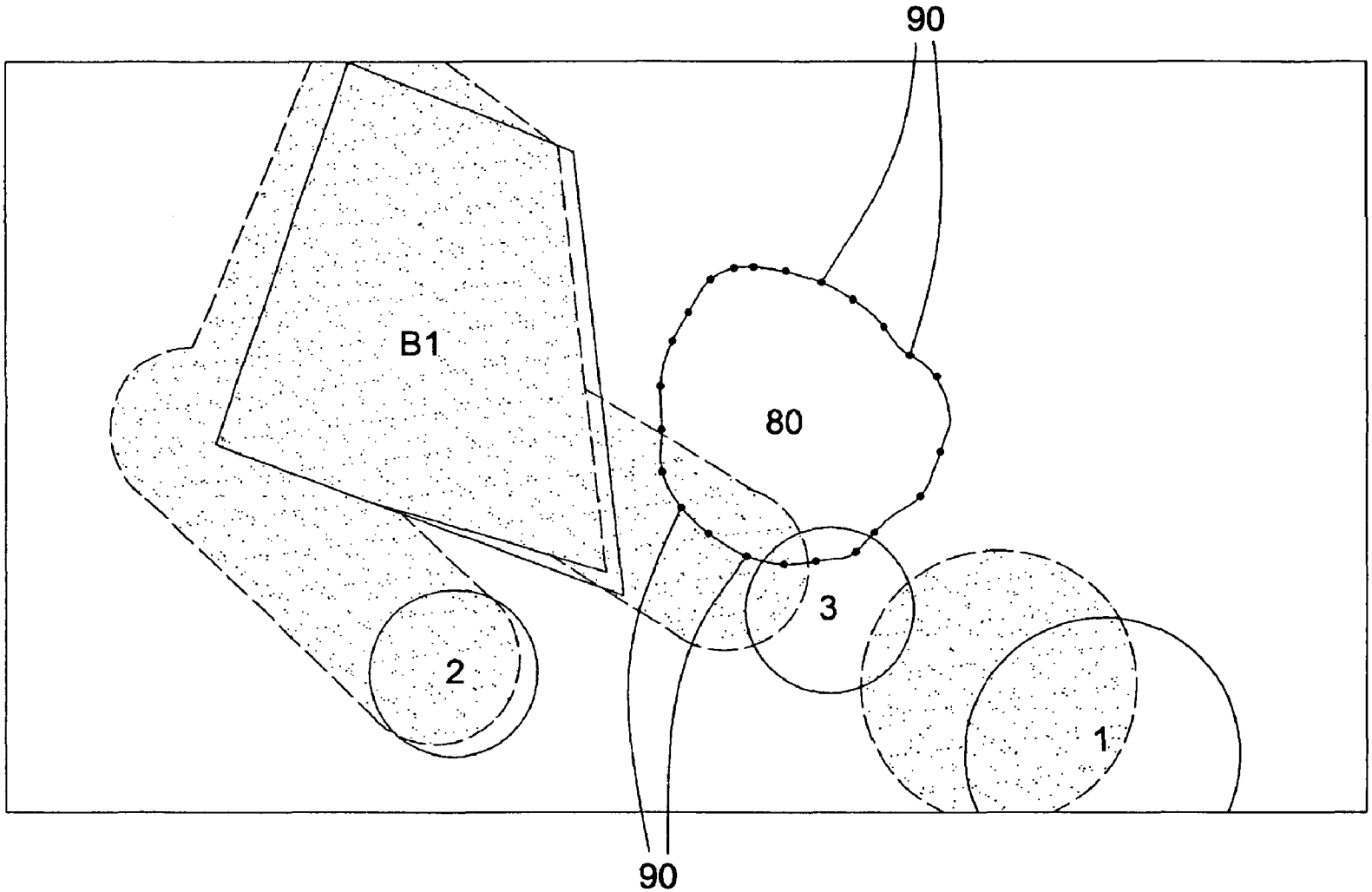
FIG. 4 shows a golf green with a plurality of relevant points that must be entered into the computer program used to practice the invention.

Referring to FIG. 4, the azimuth and distance of multiple points 90 (marked as black dots around the perimeter of the green) on the golf green 80 are preferably determined from the center of the green 80. While the green center is the most convenient location for these measurements, other locations not necessarily within the green can be used as well. These azimuth and distance readings are then entered into the program 40. This method of locating points relative to the center of the green 80 is also to be used in defining the position of the trees 1,2, and 3. The azimuth of the trees 1,2,3 are measured from the center of the green 80 along with the distance between the trees and the centre of the green. However, should this method of determining azimuth relative to the center not be practical, such as a blocked line of sight, a secondary locating position can be found. The location of this secondary position must, however, be entered into the program 40 by entering its azimuth and distance as measured from the center. By doing this, any features, such as trees, with its azimuth measured from the secondary position can have its position calculated relative to the center of the green. This is done by using a simple translational calculation with the center as the center of a planar Cartesian coordinate system and the secondary position and the feature as points on the coordinate system. Multiple secondary locations can be used as long as there azimuth, distance readings are entered into the program 40. Should the secondary locating position have a different elevation from the centre of the green, this elevation, as measured by the instrument 85, is also entered into the program 40.

After entering the location, via the azimuth and distance readings, of the trees 1, 2, and 3, other characteristics of these trees are entered into the program 40. To properly simulate the shadow cast by a tree, its crown shape and the size of the crown must be determined. This is accomplished by choosing a crown shape that fits the tree's crown as closely as possible. Possible crown shapes are umbrella, oval, pyramidal, parabolic, columnar, and round.

Figure 5:
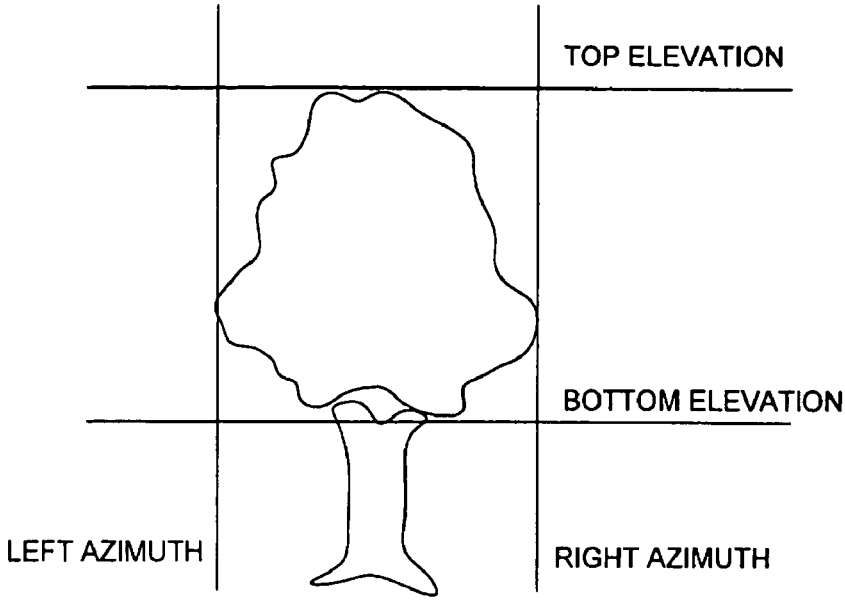
FIG. 5 shows a tree with its relevant crown azimuth readings indicated.

After determining crown shape, the characteristics of the crown are then found and, along with the crown shape, entered into the program 40. To determine the height of the tree, its elevation is measured using the measuring instrument 85. A proper determination of the crown size requires a reading of the crown's left azimuth, right azimuth, top elevation and bottom elevation. An illustration of these measurements is shown in FIG. 5.

Further azimuth and distance readings taken from different vantage points can be entered into the program 40 to further define the tree. This will give the program 40 an almost three dimensional view of the tree.

The above steps must be repeated for each tree that is sufficiently close to the green 80. However, if there is a large block of trees close by, it would be tedious and, in most cases, redundant to repeat the above steps for each and every tree. Thus, a single entry for the whole block can be made to determine the block's contribution to shade, if any. To enter a block into the program 40, azimuth and distance readings of multiple points on the block's perimeter must be made and entered into the program 40. These points must be numerous enough to define the shape of the tree block. Such readings can be made relative to either the center of the green 80 or relative to a secondary position as noted above.

After defining the tree block's perimeter, the average upper elevation of the trees in the block is taken and entered into the program 40. Similarly, an average lower elevation of the trees in the block is measured and entered into the program 40.

It must be noted that any other sunlight obstructing object, such as building B1 in FIG. 2, is entered and defined for the program 40 in a manner similar to that of a block of trees.

A blocking horizon, defined as the horizon at the green over which there is no control, such as a building or a hill, must also be entered to give a proper simulation of sunlight and shade.

After entering the relevant data regarding the sunlight blocking objects, the sun's path must be determined so that sunlight coverage can be calculated. To do so, the geographical location of the golf course must be entered. This would include entering the longitude, latitude, and magnetic declination of the course. The magnetic declination, also Known as variance in aeronautical terms, is entered to compensate for the difference between magnetic north and true north. The longitude and latitude can be found through maps, relevant software, or GPF locating devices. With respect to magnetic declination, topographic maps and other software can be used. Also, a specific date, including year, month, and day, must be entered into the program 40. The program 40 calculates, through well-known astronomical and geographical algorithms, the path the sun will travel on that specific day as seen from that specific longitude and latitude.

Figure 6:
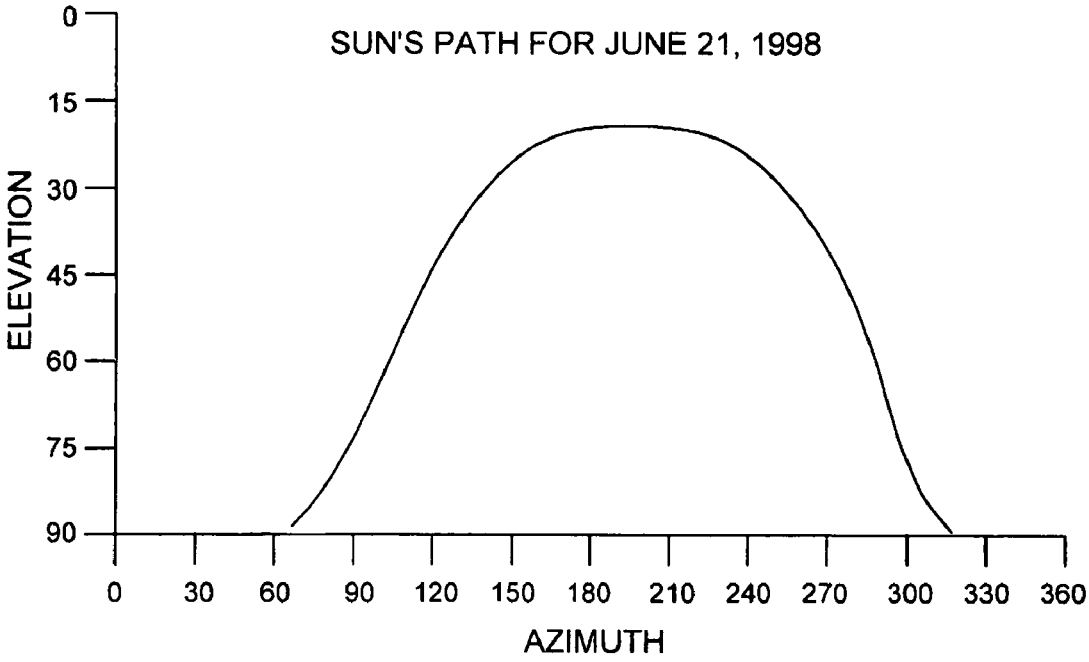
FIG. 6 is a sample diagram of the path of the sun on a specific day as observed from the center of a golf green.

A sample print out of the sun's path on a specific day is illustrated in FIG. 6. This graph illustrates where the sun will be on the date in question relative to the green 80.

After determining the sun's path, the program 40 simulates the shadow cast on the green 80 by each sunblocking object. By using well-known trigonometric and geometric methods and algorithms, the shadow cast by a sunblocking object, such as a tree, can be determined. Given the sun's position in the sky, the height and shape of the object, the shape of the shadow as projected by the object can be found by the program 40. This is done by calculating for each of a significant number of points on the silhouette of the object a point on the ground where the silhouette point would cast a shadow, given the sun's position in the sky. With enough points on the object's silhouette an outline of the tree, as projected on the ground, is obtained. This outline is the object's shadow for that specific time of day.

Using the above method for all sunblocking objects, a picture of the green, with appropriate shadows, is composed. Separate trees or objects cast separate shadows and overlapping shadows do not present a problem given that if one shadow covers a specific area, an overlapping shadow does not affect that first shadow.

Figure 7:
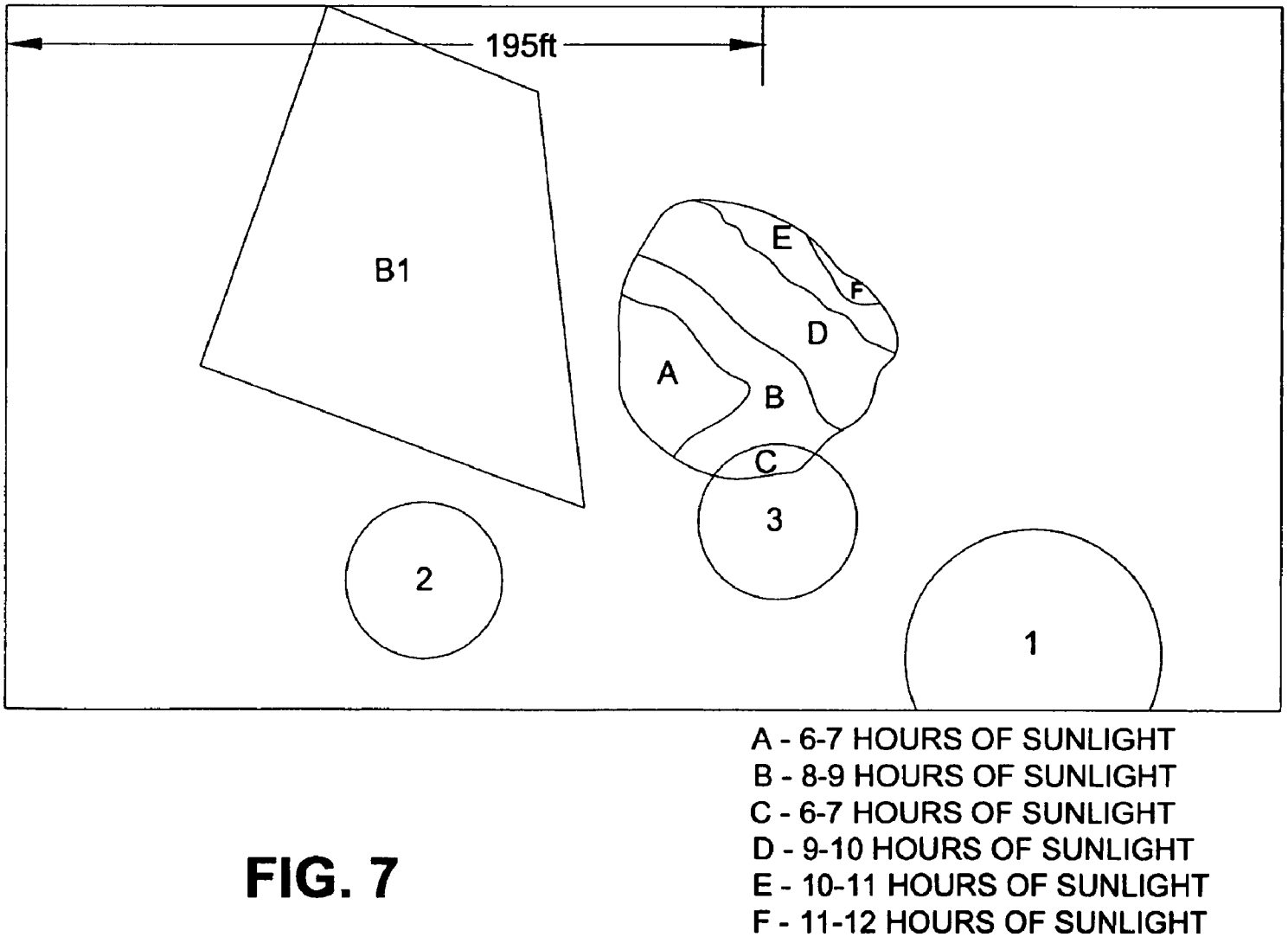
FIG. 7 is a sample diagram of the golf green coded to indicate sunlight exposure times.

An analysis of sunlight exposure is therefore now possible. Now that the program 40 knows where the sun will be in the sky at each point during daylight on the specified date, and now that the program 40 can determine where a sunblocking object's shadow will fall given a position of the sun, the program 40 then simulates a day's sunlight exposure of the green 80. The program 40, knowing the size and shape of the green 80, thus divides the green 80 into smaller unit areas. Then, by simulating the shadows falling on the green 80 for each position the sun takes in the sky, a map of sunlight exposure for the green 80 is obtained. This map not only shows which area received sunlight but also how much sunlight it receives during the day. By graphically presenting this map to an agronomist or turf manager, he or she can determine which areas are deficient of sunlight. An example of such a map is shown in FIG. 7. Portrayed on the figure are a number of zones on the green 80 with each zone marked with an indication of how much sunlight it receives during a specified day. For example, Zone A receives 6-7 hours of sunlight while Zone F receives 11-12 hours of sunlight. The map can be portrayed on either the monitor 50 or printed out on the printer 60.

Figure 8:
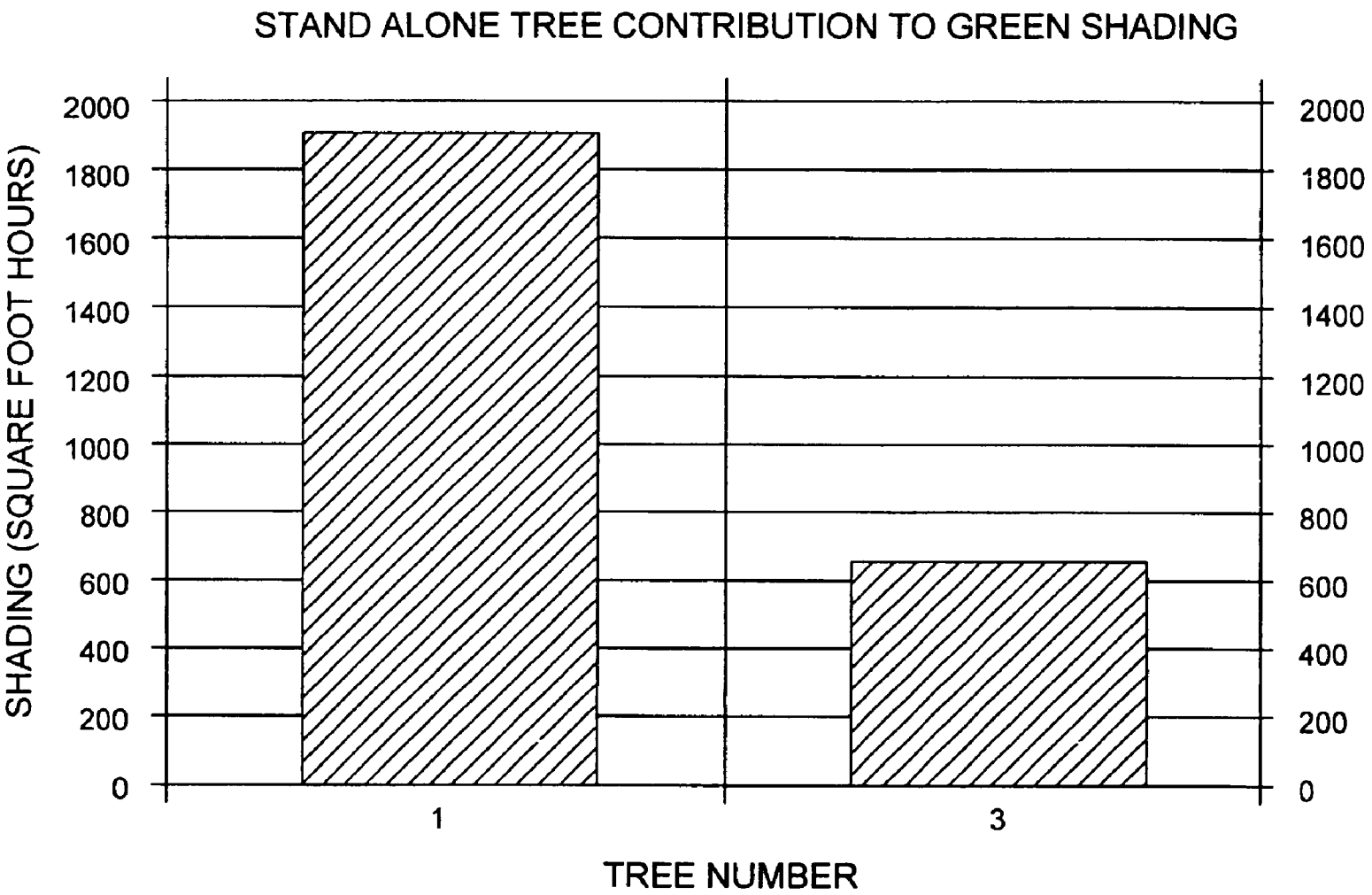
FIG. 8 is a sample graph that indicates individual tree contribution to green shade.

A further analysis of which tree contributes most to the shade falling on the green 80 is also performed by the program 40. This is accomplished by simulating each tree's shadow on the green 80 in isolating from any other sunblocking object. Thus, a tree's shadow throughout the day is simulated and the shadow's total coverage in terms of square foot hours is calculated. The program 40 can easily calculate this for every tree as the green 80 has been subdivided into numerous unit areas. The results for each tree are then graphed to show that tree's contribution to green shading. A sample graph of stand alone tree contribution to green is shown in FIG. 8.

Figure 9:
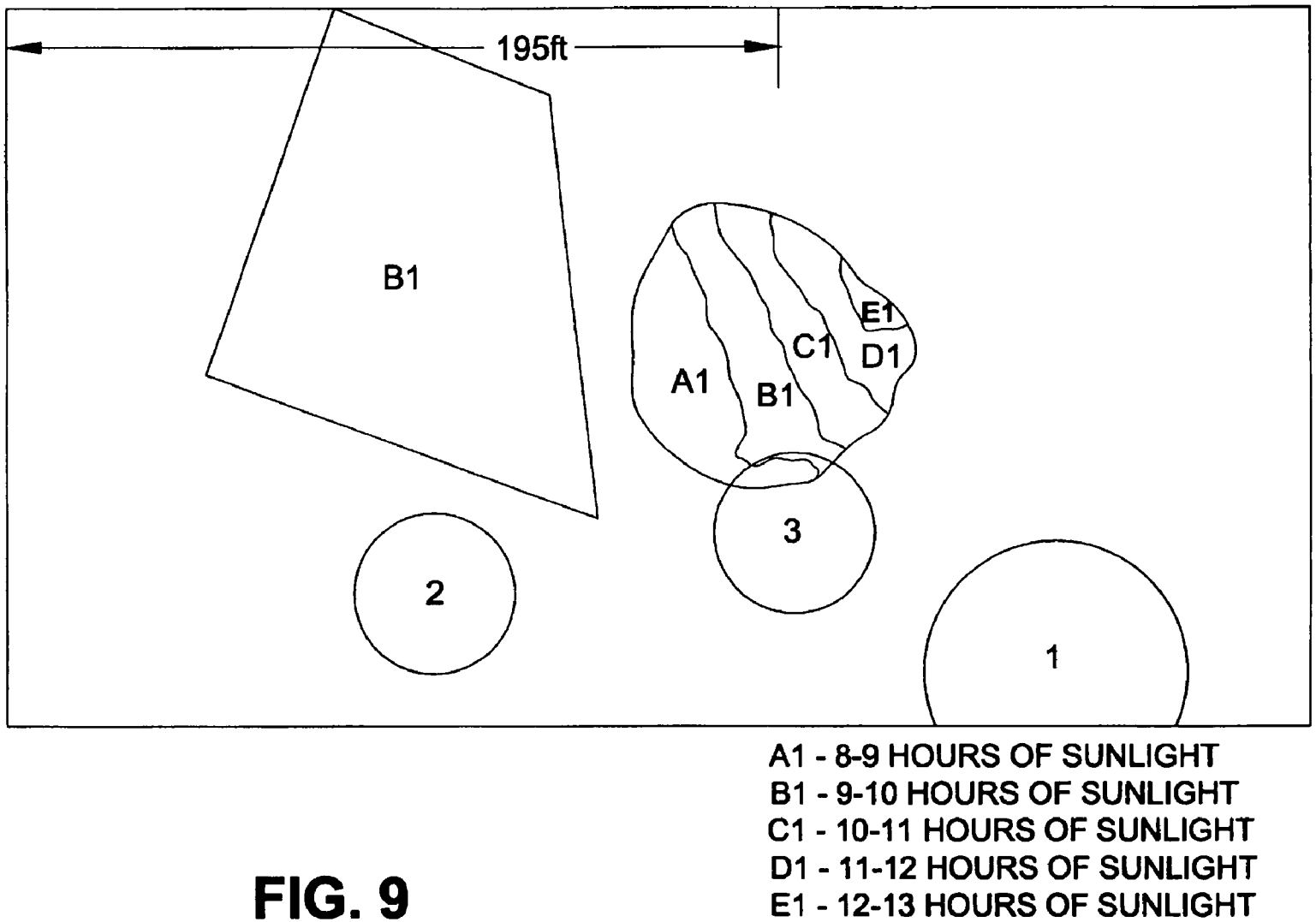
FIG. 9 is a sample coded diagram of sunlight exposure times calculated with one tree disregarded in the calculations.

The above analysis determines which tree contributes the most to green shading. Given that what is desired is an increase in sunlight exposure, the problem tree of trees is identified by observing which tree or trees on the above mentioned graph contributes the most to green shading. The next step is a simulation of possible effects on green shading by projected modification to the canopy. One possible modification is the drastic measure of eliminating the tree. To determine what effect removing a problem tree will have on green shading, the program 40 is told to disregard the problem tree in running a shadow and sunlight simulation similar to that outlined above. By generating a sunlight exposure map with the problem tree disregarded, the effect of removing the problem tree can be seen. An example of such a map is shown in FIG. 9. This FIG. 9 is similar to FIG. 7 but with tree 3 disregarded in simulating sunlight exposure. Comparing these two figures shows that there is a significant increase in sunlight exposure for most of the green 80. For example, Zone A1now receives 8-9 hours of sunlight compared to 6-7 hours in Zone A in FIG. 7. Zone E1 now receives 12-13 hours of sunlight compared to the same area (Zone E and Zone F) in FIG. 7.

Figure 10:
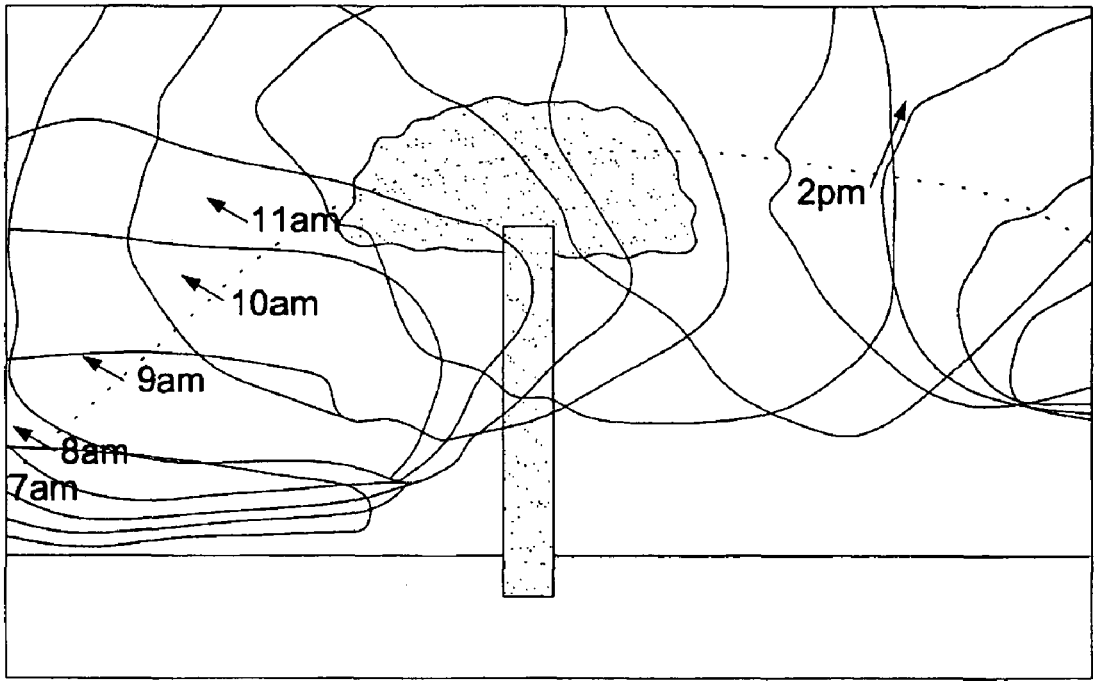
FIG. 10 is a sample picture of a tree with skewed images of the golf green superimposed to determine which parts of the tree provide the most shade.

If, on the other hand, removing the problem tree or trees is not an option, pruning the tree to reduce its size or change its shape can be considered. To assist in this, the program 40 will generate a graphical representation of the problem tree with a numerous superimposed images of the green 80 corresponding to each position of the sun. The program 40 projects a shape of the green 80, skewed based on sun angle, onto a diagram of the tree. Any portion of the tree blocking light has a part of the green shape overlapping it. An example of such an image is shown in FIG. 10. A glance at this image shows which part of the tree blocks the sun and at what time it does so. FIG. 10 shows that it is the top of the tree which blocks sunlight and that pruning is not an option, given the already sparse crown. Furthermore, the path of the sun as viewed from the centre of the green is also shown in FIG. 10 as a number of white dots. This way, the arborist can see how the sun interacts with the shade of the tree at different times of the day.

With another tree, for which pruning is an option, the arborist or turf manager can edit the tree's image by adding or subtracting to the tree's crown. Using a mouse or any other suitable pointing device connected to the system, the arborist adds or subtracts to the tree crown, using the projected green image as a guide. This effectively changes the size and shape of the tree crown and, concomitantly, the tree's shadow. Based on this new size and shape, the program 40 simulates a projected sunlight exposure on the green 80 according to the procedure outlined above. This therefore gives the arborist an idea of the effect of specific projected pruning modifications before any pruning is actually done.

To determine the effect of relocating trees, the arborist tells the program 40 to disregard a certain existing tree from its simulations. The arborist then defines a tree at the projected relocation site to the program 40 using the characteristics of the existing tree. The program 40 them simulates the shade effects of relocating the tree.

To further aid in determining the interaction between the trees and the shadows, the program 40 animates the movement of the shadows cast by trees due to the sun's movement. This is done by calculating for each sky position of the sun the position, shape, and size of each shadow. Each sky position of the sun and the shadows it generates comprises a frame of the resulting animation. This animation is shown to the arborist via the monitor 50.

It must be noted that to speed up the simulations, the arborist can edit the time increments used by the program 40. Thus, if an arborist selects 5 minute increments and as daylight lasts for 14 hours, 168 separate shadow simulations must be carried out for a complete simulation of the day's shadows. However, if the arborist selects 30 minute intervals, only 28 simulations need to be carried out, one for every 30 minute interval. Lowering the number of shadow simulations by decreasing the number of intervals, however, yields faster but less accurate results.

A further feature of the program 40 that aids the arborist is designed to spot future sunlight problems. By entering a horizontal and a vertical growth rate for every tree of interest, the program 40 calculates a tree's horizontal and vertical growth and its effect on sunlight exposure. This aging process requires that the arborist enter an aging time along with the growth rates. Thus, if a tree has a radial growth rate of 6 inches per year a horizontally and 12 inches per year vertically, aging it by three years will yield a different sunlight coverage. The aged tree will now be 36 inches wider and 36 inches taller. Based on these projected dimensions, the program 40 runs a new shadow simulation. This gives the arborist an idea of what sunlight exposure will be on the green 80 in three year's time.

A person understanding this invention may now conceive of alternative structures and embodiments or variations of the above all of which are intended to fall within the scope of the invention as defined in the claims that follow.

The embodiments of the invention in which an exclusive property or privilege is claimed are defined as follows:

1. A computer system, having data storage means and a memory, for determining sunlight exposure of an area, said system including:

input means for receiving and storing in the memory area data entries which define a size and shape of the area and a first and at least one second predetermined location,

[input means] for receiving and storing in the memory temporal data entries defining a time and date range, *and*

[input means] for receiving and storing in the memory obstruction data entries defining a size and relative position of at least one sunlight obstructing object;

processing means for performing sun calculations which determine multiple solar positions of the sun in the sky based on the temporal data entries and the area data entries,

[processing means] for performing shadow calculations for each solar position, said shadow calculations determining a size, shape and position relative to the area of a shadow cast by the or each sunlight obstructing object, *and*

[processing means] for determining for each square unit of the area a sunlight exposure time based on the shadow calculations;

output means for generating shadow calculation results and portraying a representation of the shadow calculation results, *and*

[output means] for generating sun calculation results and portraying a representation of the sun calculation results.

2. A computer system as in claim 1 wherein the area data entries include:

an earth based latitude of the area, a magnetic declination of the area area azimuth readings of multiple points on a perimeter of the area, *and* area distance readings of each of the multiple points on the perimeter, wherein said area distance readings are measured between each of the multiple points on the perimeter and the first predetermined location, and said area azimuth readings are relative to magnetic north and are determined from said first predetermined location.

3. A computer system as in claim 2 wherein the first predetermined location is within the area and the area data entries include a longitude of the area.

4. A computer system as in claim 1 wherein the area data entries include, for at least one second predetermined location, second location azimuth readings relative to magnetic north and second location distance readings, wherein second location azimuth readings are determined from the first predetermined location and the second location distance readings are measured between the at least one second predetermined location and the first predetermined location within the area.

5. A computer system as in claim 1 wherein the obstruction data entries include:

obstruction azimuth readings of the or each sunlight obstructing object, obstruction distance readings for the or each sunlight obstructing object, *and* at least one elevation reading for the or each sunlight obstructing object, wherein said obstruction distance readings are measured between a location of the or each of the sunlight obstructing object and a location chosen from the group comprising the first predetermined location and the second predetermined location, *and* said obstruction azimuth readings are relative to magnetic north and are determined from a location chosen from the group comprising the first predetermined location and the at least one second predetermined location.

6. A computer system as in claim 5 wherein the at least one sunlight obstructing object is a tree and wherein the obstruction data entries further include:

a tree crown shape for the or each tree, a crown upper elevation reading for the or each crown of the or each tree, a crown lower elevation reading for the or each crown of the or each tree, a left crown azimuth reading for the or each crown of the or each tree, *and* a right crown azimuth reading for the or each crown of the or each tree, wherein said crown elevation readings are measured between a location of the or each of the sunlight obstructing object and a location chosen from the group comprising the first predetermined location and the at least one second predetermined location, *and* said crown azimuth readings are relative to magnetic north and are determined from a location chosen from the group comprising the first predetermined location and the at least one second predetermined location.

7. A computer system as in claim 6 wherein the obstruction data entries include at least one growth rate for the or each tree and an aging time span.

8. A computer system as in claim 7 further including processing means for increasing the crown azimuth readings and the crown elevation readings for the or each tree based on the or each growth rate and the aging time span.

9. A computer system as in claim 1 wherein the at least one sunlight obstructing object is a block of trees and wherein the obstruction data entries further include:

tree block azimuth readings of multiple points on a block perimeter of the block of trees, tree block distance readings of each of the multiple points on the block perimeter, an average crown upper elevation reading for the block of trees, *and* an average crown lower elevation reading for the block of trees, wherein said tree block azimuth readings are relative to magnetic north and are determined from a location chosen from the group comprising the first predetermined location and the at least one second predetermined location, *and* said tree block distance readings are measured between each of the multiple points on the block perimeter and a location chosen from the group comprising the first predetermined location and the at least one second predetermined location.

10. A method of modifying foliage on a golf course to provide more sunlight to a golf green comprising:

determining characteristics of the green including size, shape, and location of the green;

*storing in storage of a computer the determined characteristics of the green and the foliage;* determining characteristics of the foliage including size, shape, and location relative to the green*;* performing a sun simulation of a path of the sun across the sky during a predetermined date and time range*;* performing a shadow simulation of shadows cast on the green by the foliage based on the sun simulation and the characteristics of the foliage*;* performing a unit area calculation for each unit area of the green, said unit area calculation determining an amount of sunlight each unit receives based on the shadow simulation*;* determining at least one course of action to provide more sunlight to the green based on the unit area calculation, the or each course of action being chosen from a group comprising[:]

pruning the foliage, removing the foliage*, and* relocating the foliage*;* performing a modified shadow simulation of the shadows cast on the green by the foliage if the or each course of action were followed,[.] said modified shadow simulation being based on the sun simulation and projected characteristics of the foliage*;* performing a modified unit area calculation for each unit area of the green, said modified unit area calculation determining a modified amount of sunlight each unit receives based on the modified shadow simulation*; and*

*wherein the computer is programmed to perform at least one of performing a sun simulation, performing a unit are calculation, performing a shadow simulation, determining at least one course of action, performing a modified shadow simulation, and performing a modified unit area calculation.*

11. A method of determining modifications to sunblocking objects on a golf green to provide more sunlight to the green, the method comprising:

[a. Determining] *a) determining* a size, shape, and geographical location of the green*;*

[b. Determining] *b) determining* a size, shape, and position relative to a predetermined point of at least one sunblocking object*;*

*c) storing in storage of a computer the determined characteristics of the green and the foliage;*

[c. Determining] *d) determining* a relevant path of the sun across the sky as observed from the geographical location of the green for a predetermined date and time range*;*

[d. Performing] *e) performing* a shade calculation resulting in shade results, said shade results determining an amount of shade cast on the green by the or each sunblocking object based on the relevant path of the sun and the size, shape, and position of the or each sunblocking object*;*

[e. Performing] *f) performing* a modified calculation resulting in modified shade results, said modified shade results determining a modified amount of shade cast on the green by the or each sunblocking object based on the relevant path of the sun and a modification of the or each sunblocking object, said modification being chosen from a modification group comprising[:]

altering the shape of the or each sunblocking object, removing the or each sunblocking object, altering the size of the or each sunblocking object*, and* a combination of altering the size and the shape of the or each sunblocking object*;*

[f. Determining] *g) determining* which modification from the modification group provides more sunlight to the golf green based on a comparison of the shade results and the modified shade results*; and*

[g. Generating a visual representation of the shade results and the modified shade results] *h) wherein the computer is programmed to perform at least one of performing a sun simulation, performing a unit area calcuation, performing a shadow simulation, determining at least one course of action, performing a modified shadow simulation, and performing a modified unit area calcuation.*

12. A method as in claim 11 wherein step [e)] *f)* further includes generating a visual representation of the or each sunblocking object.

*13. A computer system, having data storage means and memory, for determining sunlight exposure of at least one selected area of ground, turf or other low-lying outdoor area over one or more selected time and date ranges, with the selected area being in the vicinity of one or more existing or simulated trees, bushes or other objects which each constitute an actual or potential sunlight obstructing object relative to the selected area, said system comprising:*

*means for storing in the memory area data entries which define a size and shape of the selected area,*

*temporal data entries defining at least one time and date range, and*

*obstruction data entries defining a size and position of at least one sunlight obstructing object;*

*processing means for performing sun calculations which determine multiple solar positions of the sun in the sky based on the temporal data entries and the area data entries,*

*for performing shadow calculations for each solar position, said shadow calculations determining a size, shape and position relative to the selected area of a shadow cast by the or each sunlight obstructing objec, and*

*for determining, for each square unit of the selected area, a sunlight exposure time based on the shadow calculations;*

*output means for generating shadow calculation results and portraying a representation of the shadow calculation results, and*

*for generating sun calculation results and portraying a representation of the sun calculation results.*

*14. A computer system as in claim 13 wherein at least one of the data entries used by the processing means for performing sun calculations includes an earth based latitude of the selected area.*

*15. A computer system as in claim 14 where the area data entries further include: area azimuth readings of multiple points on a perimeter of the selected area, and area distance readings of each of the multiple points on the perimeter.*

*16. A computer system as in claim 15 wherein:*

*the area data entries include a first predetermined location associated with the selected area, and at least one second predetermined location associated with the selected area; and*

*said area distance readings are measured between each of the multiple points on the perimeter and the first predetermined location.*

*17. A computer system as in claim 16 wherein:*

*said area azimuth readings a relative to magnetic north and are determined from said first predetermined location,*

*the first predetermined location is within the selected area, and*

*the area data entries include a longitude of the area.*

*18. A computer system as in claim 13 wherein:*

*the area data entries include a first predetermined location associated with the selected area, and at least one second predetermined location associated with the selected area, which include, for at least one second predetermined location, second location azimuth readings and second location distance readings, and*

*the second location azimuth readings are determined from the first predetermined location and the second location distance readings are measured between the at least one second predetermined location and the first predetermined location within the area.*

*19. A computer system as in claim 13 wherein the obstruction data entries include:*

*obstruction azimuth readings of the or each sunlight obstructing object,*

*obstruction distance readings for the or each sunlight obstructing object, and*

*at least one elevation reading for the or each sunlight obstructing object.*

*20. A computer system as in claim 19 wherein:*

*the area data entries include a first predetermined location associated with the selected area, and at least one second predetermined location associated with the selected area,*

*said obstruction distance readings are measured between a location of the or each of the sunlight obstructing object and a location chosen from the group consisting of the first predetermined location and the second predetermined location.*

*21. A computer system as in claim 19 wherein:*

*the area data entries include a first predetermined location associated with the selected area, and at least one second predetermined location associated with the selected area, and*

*said obstruction azimuth readings are relative to magnetic north and are determined from a location chosen from the group consisting of the first predetermined location and the at least one second predetermined location.*

*22. A computer system as in claim 13 wherein said system is operatively arranged to handle a plurality of sunlight obstructing objects which are trees and wherein the obstruction data entries further include for each tree at least a tree crown shape for the tree and a crown upper evaluation reading for the tree.*

*23. A computer system as in claim 22 wherein the obstruction data entries further include for each tree a crown lower elevation reading for the tree, and at least one of crown azimuth reading for a tree selected from a group consisting of a left crown azimuth reading for the tree and a right crown azimuth reading for the tree.*

*24. A computer system as in claim 23 wherein:*

*said crown elevation readings for each tree are measured between a location of the first sunlight obstructing object and a location chosen from the group consisting of the first predetermined location and the at least one second predetermined location, and*

*said crown azimuth readings are determined from a location chosen from the group consisting of the first predetermined location and the at least one second predetermined location.*

*25. A computer system as in claim 13 wherein:*

*said system is operatively arranged to handle a plurality of sunlight obstructing objects which are trees,*

*the obstruction data entries further include for each tree include at least one growth rate for tree and an aging time span for the tree.*

*26. A computer system as in claim 25 wherein:*

*the obstruction data entries further include for each tree at least a tree crown shape for the tree and a crown upper elevation reading for the tree, and at least one of crown azimuth reading for the tree,*

*said system further comprises processing means for increasing the crown azimuth readings and the crown elevation readings for each tree based on the growth rate and the aging time span for the tree.*

*27. A computer system as in claim 13 wherein:*

*the at least one sunlight obstructing object is a block of trees;*

*the obstruction data entries further include tree block azimuth readings of multiple points on a block perimeter of the block of trees, tree block distance readings of each of the multiple points on the block perimeter, and an average crown upper elevation reading for the block of trees, and an average crown lower elevation reading for the block of trees.*

*28. A method of modifying foliage on a golf course to provide more sunlight to a golf green, the method comprising the steps of:*

*determining characteristics of the green;*

*determining characteristics of the foliage pertinent to the green;*

*storing in storage of a computer the determined characteristics of the green and the foliage;*

*performing a sun simulation of a path of the sun across the sky during a predetermined date and time range;*

*performing a shadow simulation of shadows cast on the green by the foliage based on the sun simulation and the characteristics of the foliage;*

*performing a unit area calculation for each unit area of the green, said unit area calculation determining an amount of sunlight each unit receives based on the shadow simulation;*

*determining at least one course of proposed physical action relative to the foliage to provide more sunlight to the green based on the unit area calculation;*

*performing a modified shadow simulation of the shadows cast on the green by the foliage if each proposed course of action were followed, said modified shadow simulation being based on the sun simulation and projected characteristics of the foliage; and*

*performing a modified unit area calculation for each unit area of the green, said modified unit area calculation determining a modified amount of sunlight each unit receives based on the modified shadow simulation; and*

*wherein the computer is programmed to perform at least one of performing a sun simulation, performing a unit area calcuation, performing a shadow simulation, determining at least one course of action, performing a modified shadow simulation, and performing a modified unit area calculation.*

*29. A method of modifying foliage as in claim 28, wherein:*

*the determined characteristics of the green include at least a plurality of green characteristics selected from the group of characteristics consisting of the size of the green, the shape of the green, and the location of the green;*

*the determined characteristics of the foliage include at least a plurality of foliage characteristics selected from a group characteristics consisting of the size of the foliage, the shape of the foliage, and the location of the foliage relative to the green; and*

*the proposed course of physical action to the foliage being chosen from a group of physical actions consisting of*

*pruning at least some of the foliage, removing at least some of the foliage, and relocating at least some of the foliage.*

*30. A method of evaluating proposed modifications to sunblocking objects on an area of a turf to provide more sunlight to the area of turf, the method including using a computer system programmed to perform calculations and provide visual representations and comprising the steps of:*

*a) determining a geographical location of the green;*

*b) determining a three-dimensional location for each of a plurality of sunblocking objects in the vicinity of the green;*

*c) determining a relevant path of the sun across the sky as observed from the geographical location of the green for a predetermined date and time range;*

*d) performing a shade calculation resulting in shade results, said shade results determining an amount of shade cast on the green by each such located sunblocking object based on the relevant path of the sun and the three-dimensional location of each sunblocking object; and*

*e) performing a modified calculation resulting in modified shade results, said modified shade results determining a modified amount of shade cast on the green by each located sunblocking object based on the relevant path of the sun and a proposed modification of at least a plurality of the located sunblocking objects, said proposed modification being chosen from a modification group consisting of (1) altering the shape of the sunblocking object, (2) removing the sunblocking object, (3) altering the size of the sunblocking object, and (4) a combination of altering the size and the shape of sunblocking object.*

*31. A method as in claim 30, of evaluating modifications to sunblocking objects on an area of turf, further comprising the step of:*

*f) determining which proposed modification from the modification group provides more sunlight to the golf green based on a comparison of the shade results and the modified shade results.*

*32. A method as in claim 30 wherein step (e) further includes using the computer system to generate at least one visual representation of each sunblocking object.*

* * * * *